(12) United States Patent
Brown

(10) Patent No.: US 10,486,563 B1
(45) Date of Patent: Nov. 26, 2019

(54) CAR VISOR COVER AND METHODS TO USE

(71) Applicant: Michael Brown, Jacksonville, FL (US)

(72) Inventor: Michael Brown, Jacksonville, FL (US)

( * ) Notice: Subject to any disclaimer, the term of this patent is extended or adjusted under 35 U.S.C. 154(b) by 284 days.

(21) Appl. No.: 15/583,008

(22) Filed: May 1, 2017

(51) Int. Cl.
*B60J 3/00* (2006.01)
*B60N 2/60* (2006.01)
*B60J 3/02* (2006.01)
*B60N 2/80* (2018.01)

(52) U.S. Cl.
CPC .......... *B60N 2/6036* (2013.01); *B60J 3/0278* (2013.01); *B60N 2/80* (2018.02)

(58) Field of Classification Search
CPC .................................................. B60J 3/0278
See application file for complete search history.

(56) References Cited

U.S. PATENT DOCUMENTS

| | | | |
|---|---|---|---|
| 2,931,114 A * | 4/1960 | Peterson | B60R 7/05 40/644 |
| 3,754,810 A * | 8/1973 | Starczewski | B60J 3/0278 359/488.01 |
| 4,781,409 A * | 11/1988 | Harbison | B60J 3/0208 206/0.81 |
| 4,858,989 A * | 8/1989 | Bruckstein | B60J 3/04 296/97.2 |
| 5,433,362 A * | 7/1995 | Battaglia | B60R 7/05 224/312 |
| 5,549,940 A | 8/1996 | Noone | |
| 5,871,251 A * | 2/1999 | Welling | B60J 3/0204 296/37.8 |
| 7,216,918 B1 | 5/2007 | Runfola | |
| 7,320,492 B1 * | 1/2008 | Rosenbaum | B60J 3/0208 296/97.1 |
| 7,818,907 B1 | 10/2010 | Warrington, Jr. | |
| 8,739,442 B2 * | 6/2014 | Shape | A47G 1/0616 224/312 |
| 10,183,628 B2 * | 1/2019 | Mea | A45C 11/00 |

* cited by examiner

*Primary Examiner* — Tri M Mai
(74) *Attorney, Agent, or Firm* — Lawrence J. Gibney

(57) ABSTRACT

The present invention is for a cover that can be placed over a visor in a vehicle and a cover that can be placed over the headrests of a vehicle. The cover can be customized for each individual vehicle and can operate as a temporary cover for special events or as a semi-permanent cover. The present invention is unique in how it attaches to the visor or headrest with a zipper.

8 Claims, 8 Drawing Sheets

CAR VISOR COVER AND METHODS TO USE

BACKGROUND OF THE INVENTION

A. Field of the Invention

This invention relates to customizable covers for visors in vehicles and head rests that are quick to install and easily removed when desired. The invention may also serve for long term use, depending on the user's desires.

B. Prior Art

A typical car visor has a first end, a second end, a top, a bottom, a front, and a back. While there are numerous covers for car visors and car seat head rests, none provide all the features in the present invention. Car visor covers in the prior art wrap around the top and bottom of the visor as shown in to U.S. Pat. Nos. 7,818,907 and 7,216,918. The '907 and '918 patents are distinguished from the prior art because they do not utilize a zipper, a tab, or a hook and loop assembly as the present invention does. The method of attachment disclosed in '907 and '918 are also significantly different from the present invention's method of attachment.

Another car visor cover is disclosed in U.S. Pat. No. 5,549,940, which uses adhesive to secure a cover to the driver and passenger visors within a car. The present device does not utilize adhesive because it may harm the factory material covering the visor especially in hot temperatures.

BRIEF SUMMARY OF THE INVENTION

The present invention is a cover for a car visor and a cover for a head rest. The cover is removeable and is intended to be temporarily attached to the car visor or head rest. The present invention may also be used for long periods of time if desired by the user. When installed, the cover material is to have very few wrinkles and fit tightly around the visor or head rest. The material for the cover is to be washable, fade resistant, and it can be modified depending on the make and model of the vehicle to accommodate a mirror on the visor as well as the extender that is often placed within visors.

The present invention provides a front surface, a back surface, an interior, an exterior, a top surface, a bottom surface, a first end and a second end. While the back surface is a solid piece, the front, top, and bottom surfaces each provide its own respective first portion and second portion. The first part is slipped over one end of the car visor and the second portion of the present invention is slipped over the opposing end of the car visor. A tab is provided on the second portion of the cover to assist with slipping the cover completely over the second end of the visor. The first and second portions of the cover are then zipped together, thereby, enclosing the tab on the interior of the car cover. In an alternate embodiment, the cover could be modified to cover a head rest of a car seat.

NUMBERING REFERENCE

5—Car visor cover
10a—First front portion of car visor cover
10b—Second front portion of car visor cover
17—Back surface
18—Top surface
19—Bottom surface
20—Zipper
22—Notch
25—Tab
30—Hook and loop assembly
35—Slit in the bottom surface
50—Head rest cover
60a—First back part of head rest cover
60b—Second back part of head rest cover
70—Zipper
80—Tab
90—Hook and loop assembly
100—Elastic

DETAILED DESCRIPTION OF THE EMBODIMENTS

In the automobile industry, it is typical for a driver to customize her or his vehicle. This can include temporary customizations, or semi-permanent customizations. The car visor, also known as a sun visor, is commonly modified because the factory material has deteriorated, does not provide certain features such as a sunglass holder, CD holder or business car holder, or because the user would like to make her or his visor different from the average factory car visor. Specifically, many vehicle owners modify her or his car visors or head rests by placing a cover 5 over it so that each visor or head rest represents the owner's favorite sports team, personal photo image, or displays a particular message that the owner identifies with.

The problem is that many visor covers and head rest covers do not look aesthetically pleasing. For example, the material often bunches, fades, shrinks when washed, or possibly even damages the material of the factory visor or head rest. While the present invention is described as a cover for a car visor or head rests within a car, it can be used in various types of automobiles or boats that provide visors to block sunlight.

First Embodiment

Figure 3:
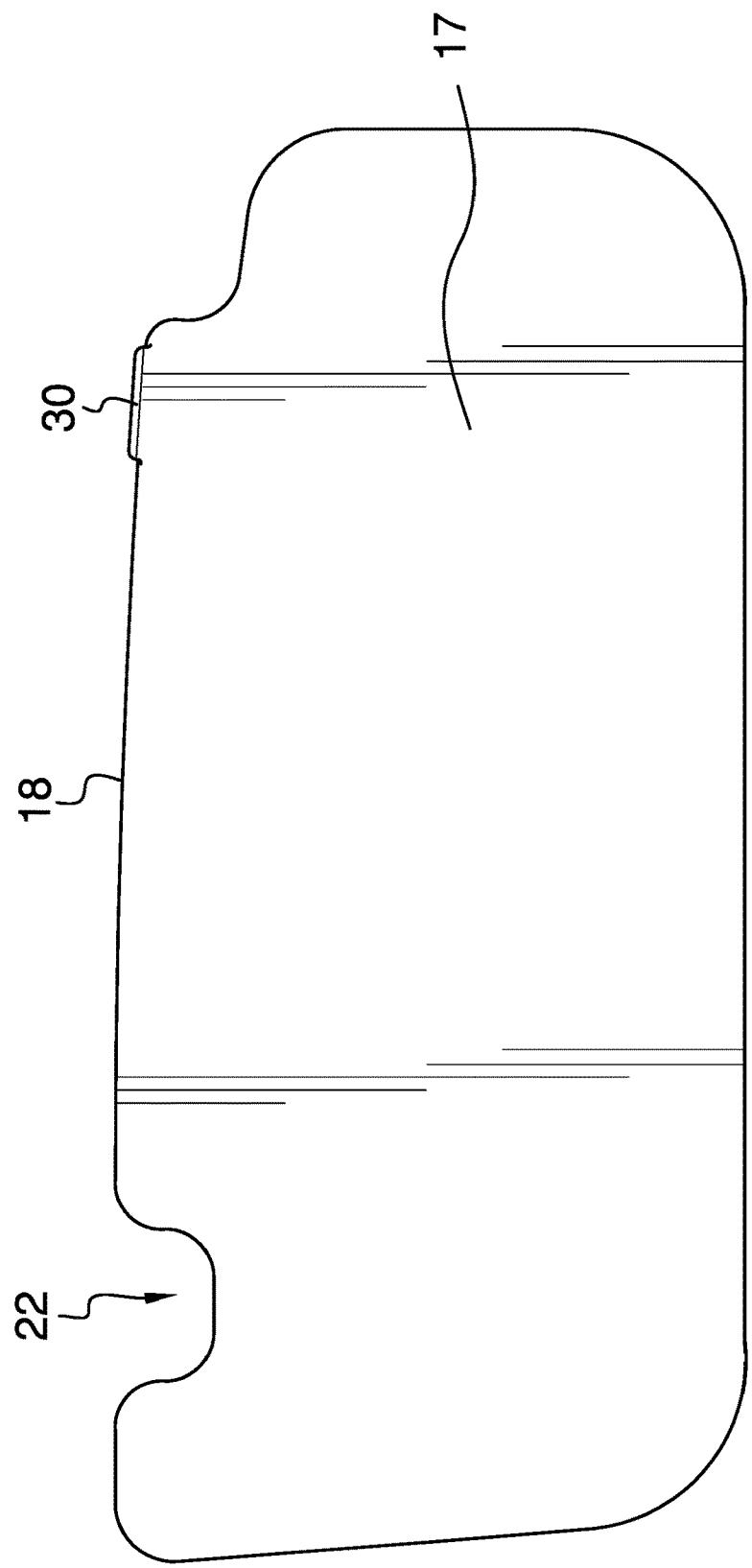
FIG. 3 is a back view of the car visor cover, which shows that the back surface of the car visor cover is a solid piece and additionally shows the hook and loop assembly in a closed position.
Figure 4:
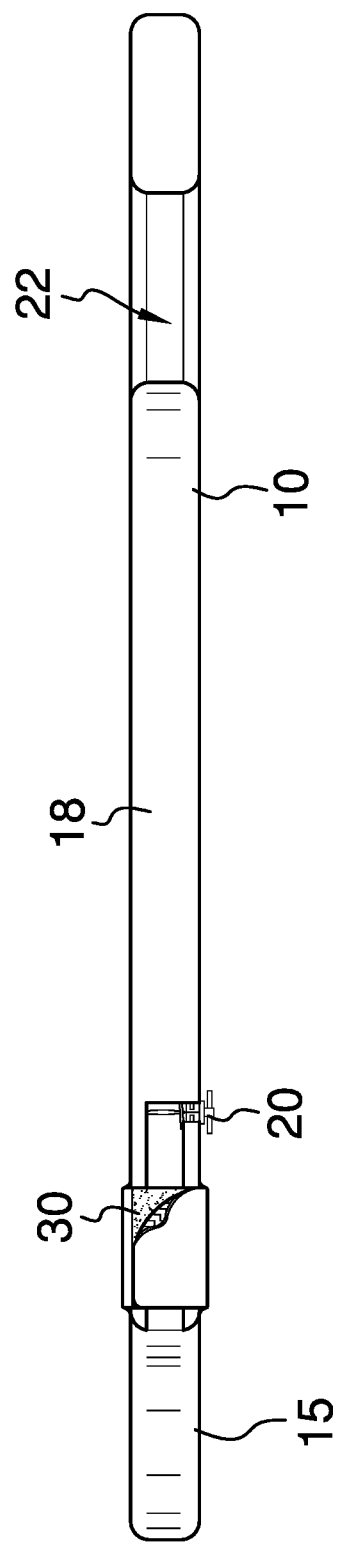
FIG. 4 is top view of the car visor cover, which shows the zipper in a closed position and the hook and loop assembly partially opened.
Figure 5:
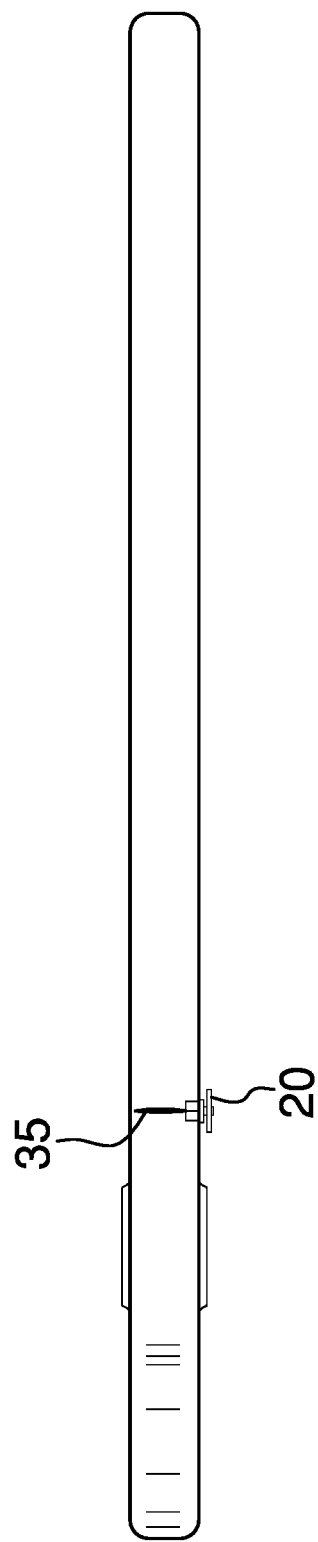
FIG. 5 is a bottom view of the car visor cover, which shows a slit in the bottom surface.

The first embodiment is a cover 5 for a visor in a vehicle. The visor cover 5 is comprised of a front surface 10, and back surface 17, a top surface 18, a bottom surface 19, an interior, and an exterior. The front, back, top, and bottom surfaces may be connected to one another with stitching. The back surface 17 spans across the back of the visor as one solid piece of material, which can be seen in FIG. 3. The front side provides a first front portion 10a, a second front portion 10b, a no-show zipper 20, and a tab 25. The top surface 18 provides a hook and loop assembly 30 to help secure the covers to the sun visor. The bottom surface 19 has a first bottom portion and a second bottom portion, which are divided by a slit 35, which is shown in FIG. 5.

Figure 1:
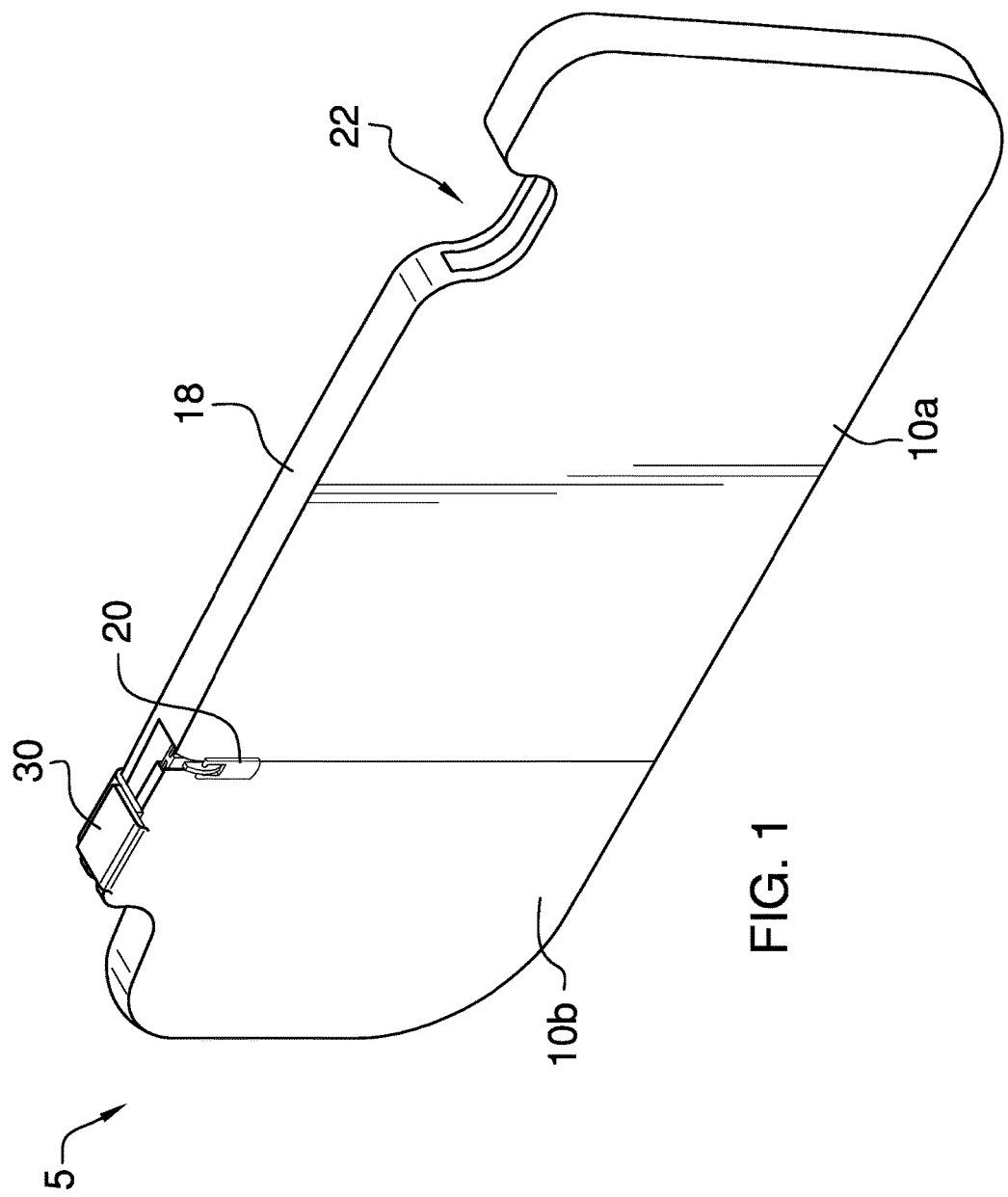
FIG. 1 is an isometric front view of the car visor cover, which shows a zipper in a closed position, a hook and loop assembly in a closed position, a first front portion, and a second front portion.
Figure 2:
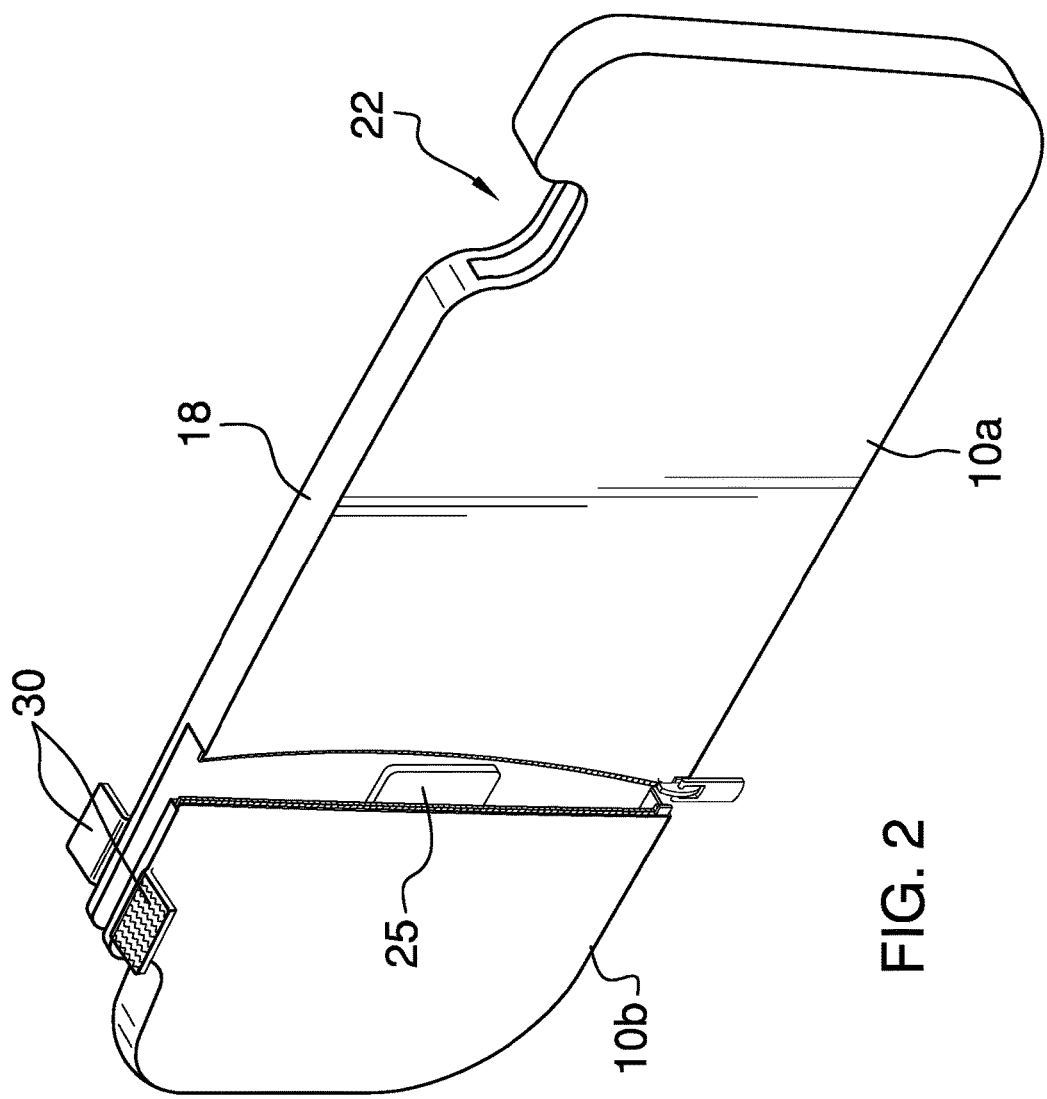
FIG. 2 is an isometric front view of the car visor cover, which shows the zipper in a partly open position, a tab, the first portion, the second portion, and the hook and loop assembly in an open position.

The no-show zipper 20 travels from the bottom 19 of the cover to the top 18 of the cover as seen in FIG. 2. It is anticipated that one of ordinary skill in the art may use another element to attach the first front portion 10a to the second front portion 10b. It is also anticipated that the no-show zipper 20 could alternatively be a regular zipper.

When the zipper 20 is in an open position two pockets are provided. A first opening is provided between the back surface 17, the first front portion 10a, the first top portion, the first bottom portion. A second opening is provided between the back surface 17, the second front portion 10b, the second top portion, and the second bottom portion.

Figure 6:
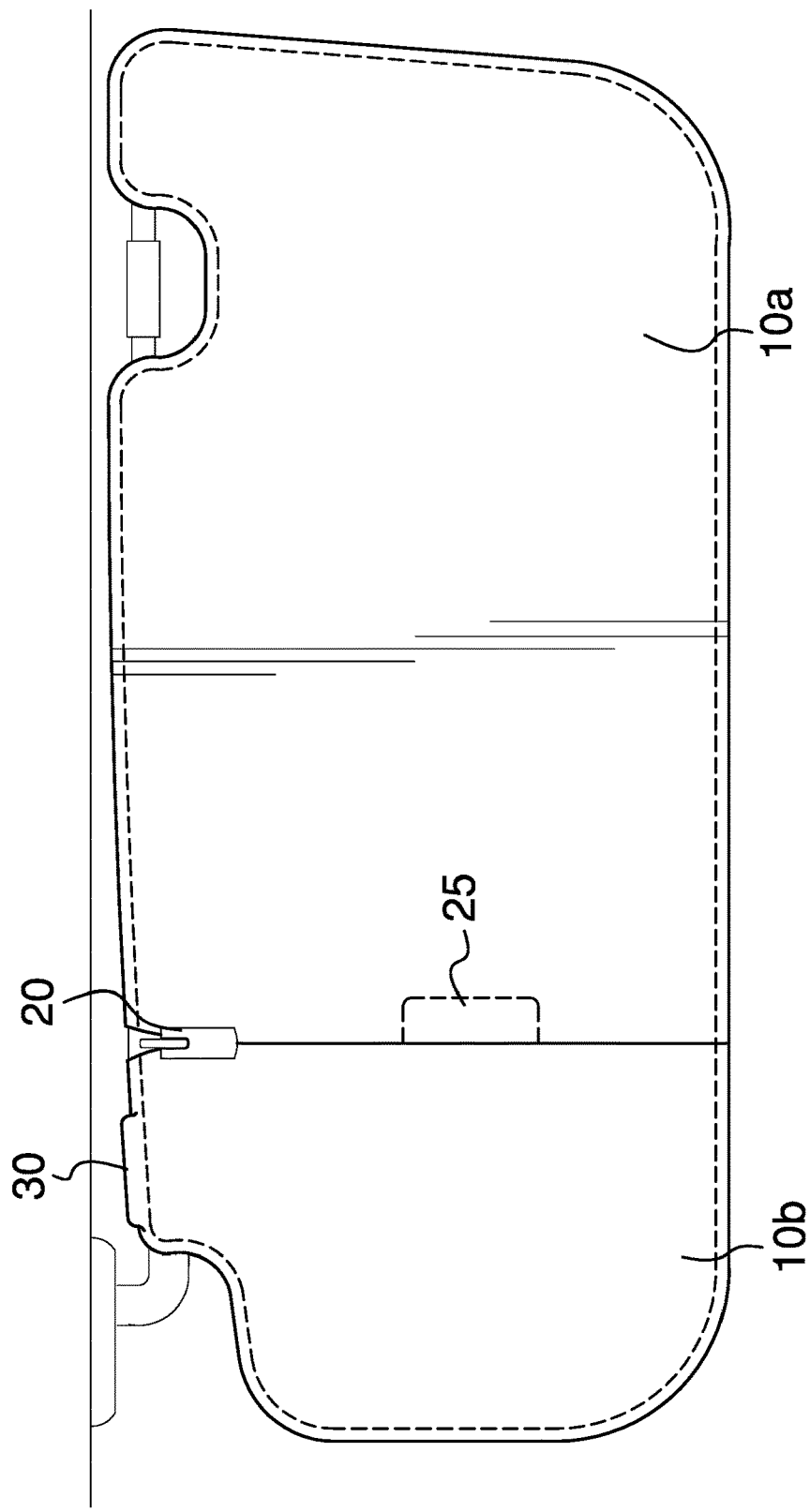
FIG. 6 is an in-use front view of the car visor cover, which shows the zipper in a mostly closed position, the hook and loop assembly is closed over the top of a car visor, and the tab shown in dotted lines representing that it is laying on the interior of the car visor cover.

The first opening of the cover slips over an end of the car visor. Then the second opening is slipped over the opposing end of the car visor. The tab 25 can be utilized to assist with pulling the second front portion 10b, the second top portion, and second bottom portion over an end of the visor. Once the first front portion 10a and the second front portion 10b are fully pulled onto the visor, the zipper 20 can be placed into a closed position. Also, the hook and loop assembly 30 can be attached which can be seen in FIG. 6.

Second Embodiment

Figure 7:
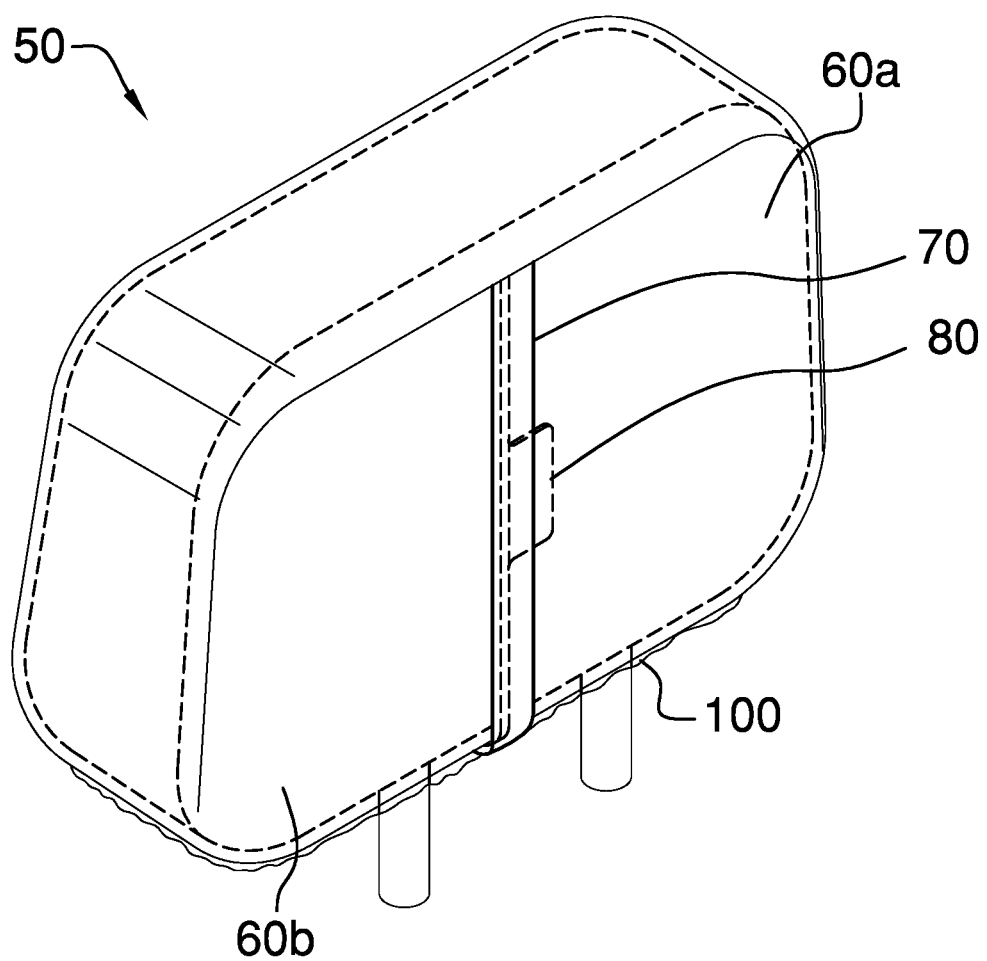
FIG. 7 is a back isometric in-use view of a head rest cover, which shows the zipper, tab, and hook and loop assembly.
Figure 8:
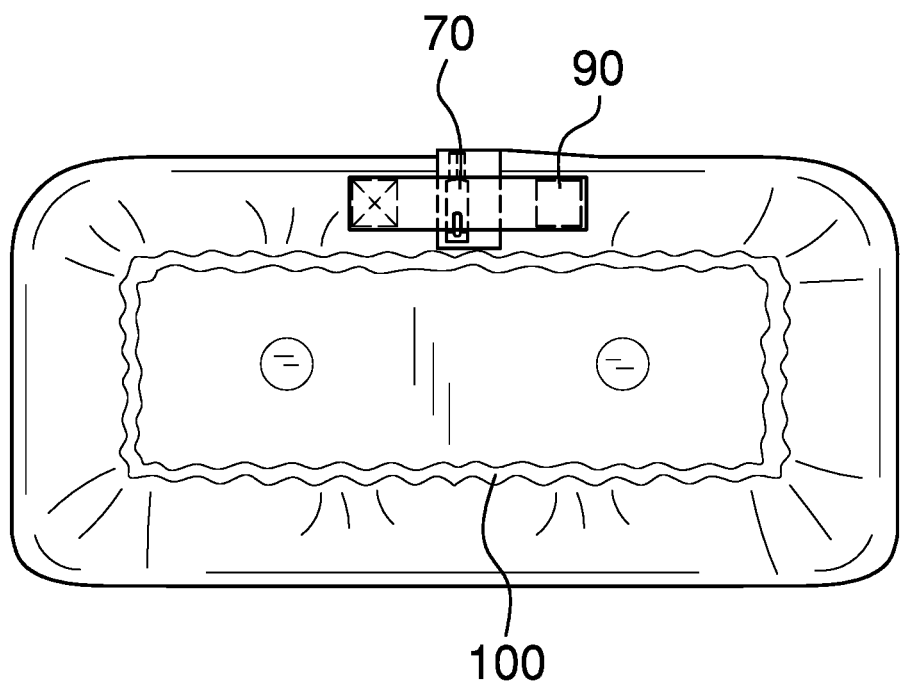
FIG. 8 is a bottom in-use view of a head rest cover, which shows the zipper, hook and loop assembly, and elastic material.

The second embodiment is a cover for a head rest 50, which is comprised of a front surface, a back surface, a top surface, and a bottom surface. The front, back, top, and bottom surfaces may be connected to one another with stitching. The front surface of the head rest cover is a solid piece similar to the back surface of the car visor cover. The back surface of the head rest cover is separated into a first portion 60a and a second portion 60b, which can be seen in FIG. 7. Once the cover is slipped over the head rest the first portion 60a and the second portion 60b are attached together with a no-show zipper 70. While the present invention discusses the use of a no-show zipper 70 for attaching the two portions of the head rest cover together, other items may be used to attach the two portions together.

A tab 80 is also provided to assist in pulling the head rest cover 50 on to the head rest. The tab 80 is intended to be connected to at least one of the two portions of the back side of the head rest. On the bottom side of the cover 50 an elastic material 100 is provided. The elastic material 100 helps ensure that the material is tight around the head rest and does not bunch. It is anticipated the that the elastic material may be further tightened with a draw string.

While the embodiments of the invention have been disclosed, certain modifications may be made by those skilled in the art to modify the invention without departing from the spirit of the invention.

The inventor claims:

1. A visor cover, which is comprised of:
    a. a front surface;
        wherein the front has a first front portion and a second front portion;
        wherein the front is of a predetermined shape;
        wherein the front is of a predetermined size;
    b. a back surface;
        wherein the back is of a predetermined shape;
        wherein the back is of a predetermined size;
    c. a top surface;
        wherein the top surface has a first top portion and a second top portion;
        wherein the top surface has a notch;
        wherein the top is of a predetermined size;
        wherein the top is of a predetermined shape;
    d. a bottom surface;
        wherein the bottom has a first bottom portion and a second bottom portion;
        wherein the bottom is of a predetermined size;
        wherein the bottom is of a predetermined shape;
    e. an interior;
    f. an exterior;
    g. a zipper;
        wherein the zipper is provided between the first front part and the second front part;
    h. a hook and loop assembly;
        wherein said hook and loop assembly is on said top surface;
    i. a slit;
        wherein said slit is provided between the first bottom portion and the second bottom portion.

2. The visor cover as described in claim 1 wherein the front surface, the back surface, the top surface, and the bottom surface are attached with stitching to one another.

3. The visor cover as described in claim 1 wherein a tab is provided on the interior of the car cover visor.

4. The visor cover as described in claim 1 wherein the first part and the second part of the front are connected with the zipper.

5. The visor cover as described in claim 1 wherein the back is one piece of material.

6. The visor cover as described in claim 4 wherein the zipper travels from the bottom of the cover to the top of the cover on the front surface.

7. A method for covering a visor of a vehicle with the visor cover described in claim 1 comprising:
    a. pulling the first front portion part onto a visor;
    b. pulling the second front portion onto the visor;
    c. attaching pieces of the zipper;
    d. closing the zipper;
    e. attaching the hook and loop assembly.

8. The method of covering a visor of a vehicle described in claim 7 wherein the pulling a second part onto a second end of visor step is accomplished by using a tab.

* * * * *